United States Patent [19]

McCoy et al.

[11] 4,403,078
[45] Sep. 6, 1983

[54] EPOXY RESIN COMPOSITION

[75] Inventors: David R. McCoy; Harold G. Waddill, both of Austin, Tex.

[73] Assignee: Texaco Inc., White Plains, N.Y.

[21] Appl. No.: 414,767

[22] Filed: Sep. 7, 1982

[51] Int. Cl.³ .............................................. C08G 59/50
[52] U.S. Cl. .................................. 525/504; 528/111; 528/123; 528/407
[58] Field of Search ...................... 528/111, 123, 407; 525/504

[56] References Cited

U.S. PATENT DOCUMENTS

| | | | |
|---|---|---|---|
| 3,645,969 | 2/1972 | Harvey | 528/111 |
| 3,795,657 | 3/1974 | Howsam et al. | 528/123 |
| 4,115,361 | 9/1978 | Schulze et al. | 528/111 |
| 4,115,446 | 9/1978 | Schulze | 528/111 X |
| 4,179,552 | 12/1979 | Waddill | 528/111 |
| 4,362,856 | 12/1982 | Kluger | 528/111 |

Primary Examiner—Earl A. Nielsen
Attorney, Agent, or Firm—Robert A. Kulason; Jack H. Park; Richard A. Morgan

[57] ABSTRACT

A novel epoxy resin curing agent comprises a polyoxyalkylenediamine biguanide salt. This novel group of compounds has an extended pot life and good adhesive properties.

6 Claims, No Drawings

EPOXY RESIN COMPOSITION

BACKGROUND OF THE INVENTION

1. Field of the Invention

This invention relates to curable epoxy resins. More particularly it relates to a novel curing agent, a polyoxyalkylenediamine biguanide salt.

2. Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. One such class of curing agents is, generally, the amines. The most commonly used amine curing agents are aliphatic amines such as diethylenetriamine, triethylenetetramine and the like and/or polyoxyalkylene polyamines; such as polyoxypropylenediamines and triamines and their amino propyl derivatives.

Epoxy resin compositions having improved physical properties are obtained by employing polyoxyalkyleneamines, and polyoxyalkylenediamines in particular, as curing agents. It is common to employ with such epoxy resin compositions a co-curing agent such as those described in U.S. Pat. No. 3,549,592.

It has been known to form oligomers from aliphatic or aromatic amines and dibasic acids or anhydrides (U.S. Pat. No. 3,732,189). Further diamines have been reacted with maleimides or anhydrides to give elastomers (U.S. Pat. No. 2,818,405). Also, thermosets have been prepared from epoxides and certain carboxyl terminated nitrogen containing compounds (U.S. Pat. No. 3,984,373).

Cured epoxy resin compositions are typically useful as coatings, castings, sealants and especially adhesives.

SUMMARY OF THE INVENTION

According to the broad aspect of the present invention, an epoxy resin is cured with a polyoxyalkylenediamine biguanide salt.

In one aspect of the present invention, a curable epoxy resin composition comprises a vicinal polyepoxide having an average of at least 1.8 reactive 1,2-epoxy groups per molecule and, an effective amount of a curing agent consisting of a polyoxyalkylenediamine biguanide salt of the formula:

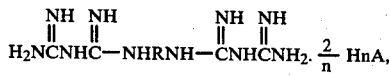

wherein C is carbon, N is nitrogen, H is hydrogen, n is an integer of from 1 to 3, A is an anion selected from the group consisting of chloride, bromide, sulfate and phosphate and R is a radical selected from the group consisting of

wherein x is an integer of from 5 to 45 and preferably 10 to 35, y is an integer of from 1 to 5, and z is an integer of from 5 to 50.

DETAILED DESCRIPTION OF THE INVENTION

According to the present inventive concept, blends of a polyepoxide, a polyoxyalkylenediamine biguanide salt of about 600 to about 2500 molecular weight and optionally an accelerator are thoroughly admixed and cured in accordance with conventional methods to provide cured epoxy resins having unexpectedly superior adhesive strength.

Generally the vicinal polyepoxide containing compositions which are amine cured are organic materials having a average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with a epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like. mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be amine cured and are in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e. g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The novel epoxy curing agent of the present invention is a polyoxyalkylenediamine biguanide salt of the formula:

wherein C is carbon, N is nitrogen, H is hydrogen, n is an integer of from 1 to 3, A is an anion selected from the group consisting of chloride, bromide, sulfate and phosphate and R is a radical selected from the group consisting of:

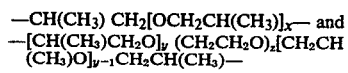

wherein x is an integer of from 5 to 45 and preferably 10 to 35, y is an integer of from 1 to 5, and z is an integer of from 5 to 50.

One class of polyoxyalkylenediamines is synthesized from the radical:

wherein all parameters are as previously defined. This class of polyoxyalkylenediamines of from about 600 to about 2500 molecular weight in combination with the above enumerated known polyepoxides produces epoxy resins of superior properties such as enhanced flexibility as evidenced by high impact strength and elongation values, superior adhesive strength and, for certain species, particularly high peel strength.

This class of polyoxyalkylene radicals can be derived from a class of diamines characterized by the formula:

H₂NRNH₂ wherein R is a polyoxyalkylene chain having terminal carbon atoms to which nitrogen atoms are bonded. R is derived from an oxypropylene group typified by the formula —OCH₂CH(CH₃)—. Diamines of this type are marketed by Texaco Chemical Co., Inc., Houston, Tex. under the trademark JEFFAMINE ® D-series.

Typical of the polyoxyalkylenediamines which may be used in the composition of the present invention is the diterminal diamine of polyoxypropylene of molecular weight 2000 marketed under the trademark JEFFAMINE ® D-2000.

Another class of polyoxyalkylenediamines is synthesized from the radical:

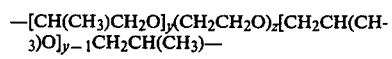

wherein all parameters are as previously defined.

This class of polyoxyalkylenediamines of from about 600 to about 2500 molecular weight in combination with the above enumerated known polyepoxides produces cured epoxy resins of superior properties such as those already mentioned.

This class of compounds can be derived from a class of diamines characterized by the formula:

H₂NRNH₂ wherein R is a polyoxyalkylene chain of molecular weight of from 600 to 2500 having terminal carbon atoms to which nitrogen atoms are bonded. R is derived from an oxyalkylene group, typified by oxyethylene (—CH₂CH₂O—) and oxypropylene (—OCH₂CH(CH₃)—) linkages. Diamines of this type are marketed to Texaco Chemical Co., Inc., Houston, Tex. under the trademark JAFFAMINE ® ED-series.

Typical polyoxyalkylenediamines which may be used in the composition of the present invention are listed in Table 1.

Table 1 a. The diterminal diamine of mixed polyoxypropylene and polyoxyethylene of molecular weight 600. As marketed under the trademark JEFFAMINE ® ED-600, the average value in the formula of y is 1.50 and of z is 8.70.
b. The diterminal diamine of mixed polyoxypropylene and polyoxyethylene of molecular weight 900. As marketed under the trademark JEFFAMINE ® ED-900, the average value in the formula of y is 1.50 and of z is 15.6.
c. The diterminal diamine of mixed polyoxypropylene and polyoxyethylene of molecular weight 2000. As marketed under the trademark JEFFAMINE ® ED-2001, the average value in the formula of y is 1.50 and of z is 41.8.

It will be apparent to those skilled in the art that many of the suitable polyoxyalkylenediamines may be available as and used as commercial mixtures of several components.

The preferred biguanide salt is prepared essentially in two steps. A method is fully described in U.S. Pat. No. 3,909,200 which is incorporated herein in its entirety by reference.

In the first step a salt is prepared by reacting a polyoxyalkylenediamine as previously defined having a molecular weight of from about 600 to about 2500 with a desired acid at an approximate ratio of one equivalent of acid for every amine functionality, to produce an amine salt.

In a second step the salt is treated with a slight molar excess (based on amine groups present) of dicyandiamide (cyanoguanidine) and heated in the presence or absence of added solvent at about 100° C. to 200° C. (preferably 150° C.) for 1 to 10 hours until the biguanide salt is formed.

Inorganic acids such as HCl or $H_2SO_4$ are preferred for this reaction. It has been found to be necessary to neutralize each amine functionality with an equivalent of acid for the biguanide formation to take place. Excess acid can be employed but is not desirable. Less than one mole of acid/mole of amine can be utilized only if a di- or tri-basic acid is used.

Finally, in curing the epoxy resin, the reactants are simply admixed in correct equivalent ratios in a suitable reaction vessel and heated, if necessary, until the reaction occurs. Curing may be accomplished under ambient conditions. If the ultimate in physical properties is required of the system, an additional cure at elevated temperature (100° C. to 150° C.) for a short period of time (½ to 4 hours is desirable).

Optionally, the epoxy resin formulations of the present invention can include an "accelerator" to speed the amine cure of the epoxy resin, especially at ambient temperatures. In several applications, accelerated cure is beneficial, especially when an epoxy resin is used as an adhesive in flammable environment, thus making elevated temperature cure inconvenient or even hazardous. Lee, H. and Neville, K., *Handbook of Epoxy Resins*, pp. 7–14 describes the use of certain amine-containing compounds as epoxy curing agent-accelerators.

Many accelerators are known in the art which can be utilized in accordance with the present invention. Examples include salts of phenols, salicyclic acids, amine salts of fatty acids such as those disclosed in U.S. Pat. No. 2,681,901 and tertiary amines such as those disclosed in U.S. Pat. No. 2,839,480. A preferred accelerator in accordance with the instant invention is disclosed in U.S. Pat. No. 3,875,072 issued to G. Waddill, Apr. 1, 1975. The accelerator comprises a combination of piperazine and an alkanol amine in a weight ratio of about 1:8 to 1:1.

The amine cured resins having superior adhesion in accordance with the present invention are prepared in a conventional manner. The low and high molecular weight amine curing agents are admixed with the polyepoxide composition in amount according to the amine equivalent weight of the curing agents employed. Generally the number of equivalents of amine groups is from about 0.8 to about 1.2 times the number of epoxide equivalents present in the curable epoxy resin composition, with a stoichiometric amount being preferred. When using an accelerator, amounts of accelerator from 1 to about 10 parts by weight based on 100 parts by weight of the resin are generally satisfactory. The exact amount of constituents in accordance with the above general requirements will depend primarily on the application for which the cured resin is intended.

The curing agents and other additives are incorporated into the uncured resin by admixing. Preferably, the polyoxyalkylenediamine is first admixed with the accelerator prior to addition to the resin. The constituents forming the curable material are then intimately admixed by standard methods and degassed in the presence of a commercial defoamer and minute amounts of silicone oils to prevent voids and bubbles.

Although all of the epoxy resins disclosed herein are generally useful in accordance with the present inventive concept, those based on aliphatic compounds are preferably not used exclusively. The presence of resins containing polyglycidyl ethers of polyhydric phenols in amounts greater than 50% by weight of the resin constituent, and more preferably 80% by weight and most preferably 100% by weight has been shown to greatly enhance the desirable properties of the cured material, especially the adhesive strength.

It will further be realized that various conveniently employed additives can be admixed with the polyepoxide containing composition of the present invention prior to final cure. For example, in certain instances it may be desired to add minor amounts of other polyoxyalkleneamine co-catalysts or hardeners along with various other accelerators and curing agent systems well known in the art.

Additionally, conventional pigments, dyes, fillers, flame retarding agents and the like which are compatible, natural or synthetic resins can be added.

Furthermore, although not preferred, known solvents for polyepoxide materials such as toluene, benzene, xylene, dioxane, ethylene glycol monomethylether and the like can be used. The polyepoxide resins containing the additives of the present invention can be used in any of the above applications for which polyepoxides are customarily used. The compositions of the present invention can be used as impregnants, surface coatings, pottings, encapsulating compositions, laminates, and particularly and more importantly, as adhesives for bonding metallic elements or structures permanently together.

The following Examples illustrate the nature of the present invention but are not intended to be limitative thereof.

EXAMPLE I

A. Preparation of Biguanide Salt from JEFFAMINE® D-2000

A one-liter resin flask equipped with mechanical stirrer, thermometer and nitrogen inlet was charged with 618 grams of JEFFAMINE® D-2000 and 61 grams concentrated hydrochloric acid. The mixture was vacuum stripped at 100° C. to remove all traces of water. Dicyandiamide (65.2 grams; 1.25 equivalents) was added and the mixture was stirred under nitrogen atmosphere for seven hours to obtain the desired bis(biguanide) hydrochloride salt; identified by total amine analysis and infrared spectrum.

B. Curing of the Epoxy Resin

Liquid Epoxy Resin (weight per epoxide 185)—100 pbw.
JEFFAMINE® D-2000 bis(biguanide).2HCl—150 pbw.

The epoxy resin and biguanide salt were separately preheated to 80° C. and then combined and mixed thoroughly. A small amount of a commercial defoaming agent was added. After complete mixing, the resin system was placed under vacuum (about 1 to 5 mm Hg) until the mixture was thoroughly degassed.

An aluminum mold was preheated to 100° C. Vacuum was discontinued and the mixture was poured into the preheated mold which maintained a ⅛ inch spacing by means of TEFLON® gasket. The casting was cured for two hours at 100° C. followed by a four hour cure at 150° C. The casting was then removed from the cooled mold and cut into test samples.

The test samples were subjected to several tests to determine physical and adhesive properties. Adhesive properties are reported in Example III. Physical properties are reported in Example IV.

The general procedure of Example I-A and I-B was repeated using 510 grams JEFFAMINE® ED-600, 170.3 grams concentrated HCl and 182 grams dicyandiamide to prepare the desired ED-600 bis(biguanide) hydrochloride.

The general procedure of Example I-A and I-B was repeated using 553 grams JEFFAMINE® ED-2001, 55.3 grams concentrated HCl and 59 grams dicyandiamide to prepare the desired ED-2001 bis(biguanide) hydrochloride.

In a similar manner, the biguanide salts of ED-900 and M-1000 were prepared.

Test results are reported in Example III and Example IV.

EXAMPLE II

M-1000 is a polyoxyalkylene monoamine formed by alkoxylating several mono-hydro alcohols followed by reductive amination to form the monoamine. JEFFAMINE® M-1000 has an approximate molecular weight of 1000 and is typified by the formula:

$$CH_3O[CH_2CH_2O]_{18.6}[CH_2(CH_3)CHO]_{1.6}CH_2(CH_3)CHNH_2$$

The biguanide salt prepared from JEFFAMINE® M-1000 resulted in an epoxy system with poor adhesive strength compared to the biguanide prepared from difunctional amines. Castings from the M-1000 derived biguanide salt did display satisfactory properties. Other formulations provided either high tensile shear strength or high peel strength with the bis(biguanide) salts prepared from either JEFFAMINE® ED-2001 and D-2000 providing quite a good balance of these properties.

| Gel time for epoxy formulations cured with biguanide salts at various temperatures. | | | | | |
|---|---|---|---|---|---|
| FORMULATION[4] | A | B | C | D | E |
| Liquid epoxy resin (WPE~185)[3] | 100 | 100 | 100 | 100 | 100 |
| JEFFAMINE ® D-2000 bis(biguanide).2HCl | 150 | — | — | — | — |
| JEFFAMINE ® ED-2001 bis(biguanide).2HCl | — | 50 | — | — | — |
| JEFFAMINE ® M-1000 biguanide.HCl | — | — | 50 | — | — |
| JEFFAMINE ® ED-900 bis(biguanide).2HCl | — | — | — | 50 | — |
| JEFFAMINE ® ED-600 bis(biguanide).2HCl | — | — | — | — | 35 |
| Gel time, mins.[1] at | | | | | |
| 80° C. | 136.7 | 734.7 | 1274.9 | 157.5 | 241.2 |
| 125° C. | 12.4 | 20.3 | 23.9 | 7.9 | 13.6[2] |
| 150° C. | 6.6 | 13.6 | 13.7 | 6.7 | — |
| 180° C. | 5.2 | 7.5 | 7.7 | 4.5 | 32.8[2] |

[1]Gardco Gel Timer; Paul N. Gardner Co.
[2]Non-homogenous gelation
Weight per epoxide unit (WPE)
[4]JEFFAMINE ® products are polyoxyalkylene polyamines with approximate molecular weights corresponding to the number following.

All systems had an extended pot life or working time after mixing at temperatures at high as 80° C., but cured readily at about 125° C. or higher.

EXAMPLE III

| Adhesive properties of epoxy systems cured with biguanide salts. | | | | | |
|---|---|---|---|---|---|
| Formulation: | A | B | C | D | E |
| Liquid epoxy resin (WPE~185) | 100 | 100 | 100 | 100 | 100 |
| JEFFAMINE ® D-2000 bis(biguanide).2HCl | 150 | — | — | — | — |
| JEFFAMINE ® D-2001 bis(biguanide).2HCl | — | 50 | — | — | — |
| JEFFAMINE ® M-1000 biguanide.HCl | — | — | 50 | — | — |
| JEFFAMINE ® ED-900 bis(biguanide).2HCl | — | — | — | 50 | — |
| JEFFAMINE ® ED-600 bis(biguanide).2HCl | — | — | — | — | 35 |
| Adhesive Properties[1]: | | | | | |
| Tensile shear strength, psi (A.S.T.M. Standard Test Method: D1002) | 1400 | 1500 | 700 | 4500 | 3000 |
| T-peel strength, pli (A.S.T.M. Standard Test Method: D1876) | 15.9 | 35.5 | 1.0 | 3.8 | 2.6 |

[1]Cured one hour at 150° C.

Of those tested, only the biguanide hydrochloride prepared from JEFFAMINE®, M-1000 did not provide satisfactory adhesive properties. JEFFAMINE®

EXAMPLE IV

| Physical properties of epoxy systems cured with biguanide salts. | | | | | |
|---|---|---|---|---|---|
| FORMULATION | A | B | C | D | E |
| Liquid epoxy resin (WPE~185) | 100 | 100 | 100 | 100 | 100 |
| JEFFAMINE ® D-2000 bis(biguanide).2HCl | 150 | — | — | — | — |
| JEFFAMINE ® ED-2001 bis(biguanide).2HCl | — | 50 | — | — | — |
| JEFFAMINE ® M-1000 biguanide.HCl | — | — | 50 | — | — |
| JEFFAMINE ® ED-900 bis(biguanide).2HCl | — | — | — | 50 | — |
| JEFFAMINE ® ED-600 bis(biguanide).2HCl | — | — | — | — | 35 |
| Properties of cured ⅛ in. casting:[1] | A | B | C | D | E[2] |
| Izod impact strength, ft.-lbs./in. (ASTM Test D-256) | 1.03 | 4.93 | 0.84 | 0.16 | — |
| Tensile strength, psi | 800 | 2200 | 2200 | 8000 | — |

| Physical properties of epoxy systems cured with biguanide salts. | | | | | |
| --- | --- | --- | --- | --- | --- |
| (ASTM Test D-638) | | | | | |
| Tensile modulus, psi | 10800 | 19700 | 23900 | 399000 | — |
| (ASTM Test D-638) | | | | | |
| Elongation at break, % | 60 | 85 | 76 | 8.8 | — |
| (ASTM Test D-638) | | | | | |
| Flexural strength, psi | 600 | 400 | 500 | 13200 | — |
| (ASTM Test D-790) | | | | | |
| Flexural modulus, psi | 12700 | 16600 | 17800 | 361000 | — |
| (ASTM Test D-790) | | | | | |
| HDT, °C., 264 psi/66 psi | <25/<25 | <25/<25 | <25/<25 | 46/48 | — |
| (ASTM Test D-648) | | | | | |
| Shore D hardness, 0–10 sec. | 44–43 | 65–53 | 62–52 | 82–80 | |
| (ASTM Test D-2240) | | | | | |
| Shore A hardness, 0–10 sec. | 91–87 | — | — | — | — |
| (ASTM Test D-2240-64T) | | | | | |

[1] cured 2 hours 100° C., 4 hours 150° C.
[2] Panel non-homogeneous after curing; separation of phase noted. Could not cut into test panels. This epoxy system is noted for its superior adhesive qualities as shown in Example III.

The principle of the invention and the best mode contemplated for applying that principle have been described. It is to be understood that the foregoing is illustrative only and that other means and techniques can be employed without departing from the true scope of the invention defined in the following claims.

What is claimed is:

1. An epoxy resin composition comprising:
a vicinal polyepoxide having an average of at least 1.8 reactive 1,2-epoxy groups per molecule, and an effective amount of a curing agent consisting of a polyoxyalkylenediamine biguanide salt of the formula:

wherein C is carbon, N is nitrogen, H is hydrogen, n is an integer of from 1 to 3, A is an anion selected from the group consisting of chloride, bromide, sulfate and phosphate and R is a radical selected from the group consisting of:

$-CH(CH_3)CH_2(OCH_2CH(CH_3))_x-$ and $-[CH(CH_3)CH_2O]_y(CH_2CH_2O)_z[CH_2CH(CH_3)O]_{y-1}CH_2CH(CH_3))-$ wherein x is an integer of from 5 to 45, y is an integer of 1 to 5, and z is an integer of from 5 to 50.

2. The composition of claim 1 which additionally contains an accelerator.

3. The composition of claim 1 wherein n is 1 and A is chloride such that 2/n HnA is 2 HCl.

4. The composition of claim 1 wherein R is the radical $-CH(CH_3)CH_2[OCH_2CH(CH_3)]_x-$ and wherein R has a molecular weight of from 600 to 2500.

5. The composition of claim 1 wherein x is an integer of from 10 to 35.

6. The composition of claim 1 wherein R is the radical $-[CH(CH_3)CH_2O]_y(CH_2CH_2O)_z[CH_2CH(CH_3)O]_{y-1}CH_2CH(CH_3)-$ and wherein R has a molcular weight of from 600 to 2500.

* * * * *